United States Patent
Xiang et al.

(10) Patent No.: US 8,521,161 B2
(45) Date of Patent: *Aug. 27, 2013

(54) SYSTEM AND METHOD FOR COMMUNICATIONS DEVICE AND NETWORK COMPONENT OPERATION

(71) Applicant: FutureWei Technologies, Inc., Plano, TX (US)

(72) Inventors: Justin Zengjun Xiang, Vernon Hills, IL (US); Hinghung Anthony Chan, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/629,055

(22) Filed: Sep. 27, 2012

(65) Prior Publication Data

US 2013/0023268 A1 Jan. 24, 2013

Related U.S. Application Data

(63) Continuation of application No. 12/638,639, filed on Dec. 15, 2009.

(60) Provisional application No. 61/222,967, filed on Jul. 3, 2009.

(51) Int. Cl.
*H04W 4/00* (2009.01)

(52) U.S. Cl.
USPC ........ 455/435.1; 455/411; 455/436; 455/442; 455/432.1; 455/410

(58) Field of Classification Search
USPC ................... 455/435.1, 411, 436, 442, 432.1, 455/410
See application file for complete search history.

(56) References Cited

U.S. PATENT DOCUMENTS

| 5,729,537 A | 3/1998 | Billstöm |
| 6,728,514 B2 | 4/2004 | Bandeira et al. |

(Continued)

FOREIGN PATENT DOCUMENTS

| CN | 1777113 A | 5/2006 |
| CN | 1801764 A | 7/2006 |

(Continued)

OTHER PUBLICATIONS

Kafle, V.P., et al, "Generic identifiers for ID/locator split internetworking," Innovations in NGN: Future Network and Services, 2008. K-INGN 2008. First ITU-T Kaleidoscope Academic Conference, May 12-13, 2008, pp. 299-306.

(Continued)

*Primary Examiner* — Nghi H Ly
(74) *Attorney, Agent, or Firm* — Slater & Matsil, L.L.P.

(57) ABSTRACT

A system and method for communications device and network component operation in an ID/Locator Split Based heterogeneous network is provided. A method for control node operation includes receiving an attach request, and attempting to authenticate/authorize the communications node. The attach request is a request from a communications node to attach to a heterogeneous network. The method also includes if the communications node authenticated/authorized successfully, causing an identification and a location to be assigned for the communications node, completing an attachment for the communications node, and transmitting information to the communications node. The method further includes if the communications node did not authenticate/authorize successfully, sending an attach reject message to the communications node. The identification and the location are separate values.

22 Claims, 6 Drawing Sheets

(56) References Cited

U.S. PATENT DOCUMENTS

| | | |
|---|---|---|
| 7,653,037 B2 | 1/2010 | Prakash et al. |
| 8,036,172 B1 | 10/2011 | Breau |
| 8,116,735 B2 | 2/2012 | Liu et al. |
| 2002/0062379 A1 | 5/2002 | Widegren et al. |
| 2005/0130659 A1 | 6/2005 | Grech et al. |
| 2007/0293249 A1 | 12/2007 | Wang |
| 2009/0221265 A1 | 9/2009 | Liu et al. |
| 2011/0003546 A1* | 1/2011 | Xiang et al. .................. 455/26.1 |

FOREIGN PATENT DOCUMENTS

| | | |
|---|---|---|
| CN | 101123536 A | 2/2008 |
| CN | 101317477 A | 12/2008 |

OTHER PUBLICATIONS

International Search Report and Written Opinion of the Patent Cooperation Treaty received in International Application No. PCT/CN2010/074976, mailed Oct. 8, 2010, 14 pages.

Chinese First Office Action with Partial Translation received in Chinese Application No. 201080015328.0 mailed May 10, 2013, 19 pages.

3rd Generation Partnership Project; Technical Specification Group Services and System Aspects; General Packet Radio Service (GPRS) enhancements for Evolved Universal Terrestrial Radio Access Network (E_UTRAN) access (Release 9), 3GPP TS 23.401 v9.1.0 (Jun. 2009), 234 pages.

Chinese Search Report received in 2010800153280, mailed May 2, 2013, 3 pages.

\* cited by examiner

SYSTEM AND METHOD FOR COMMUNICATIONS DEVICE AND NETWORK COMPONENT OPERATION

This application is a continuation of U.S. Non-Provisional patent application Ser. No. 12/638,639 entitled "System and Method for Communications Device and Network Component Operation," filed on Dec. 15, 2009, which claims priority to U.S. Provisional Application No. 61/222,967, filed on Jul. 3, 2009, both of which are hereby incorporated by reference herein as if reproduced in their entireties.

TECHNICAL FIELD

The present invention relates generally to communications, and more particularly to a system and method for communications device and network component operation in an ID/Locator Split Based heterogeneous network.

BACKGROUND

With the further evolution of fixed-mobile broadband networks beyond 3G/4G, there is a great need to further flatten the future broadband network architecture to improve network efficiency and performance, reduce network capital expenditure and operational expenditure, enable new advanced features and services. Identity (ID) and locator (LOC) split is one of the key technologies that enables an ultra flat network architecture and better support of mobility, security and multi-homing in that network environment.

In many previous and current generation networks, a communication device's ID and location may usually be tied to the communication device's address, for example, an Internet Protocol (IP) address. IP address describes the topological location of the host and is also used for identifying the host, which is very inefficient especially when mobility is involved. When tied to an IP address, the communication device's ID and location are typically bound together and if the communication device's location were to change, such as, when the communication device were to roam onto a different network (a visited network), then the communication device's ID would also change.

With ID-locator split, a communication device's ID and location may no longer be tied together. Then, when a communication device's location changes, it may not be necessary to change the communication device's ID. This may simplify network operation, thereby potentially reducing network capital expenditure and operational expenditure since hardware and software support requirements may be reduced.

SUMMARY OF THE INVENTION

These technical advantages are generally achieved, by embodiments of a system and method for communications device and network component operation in an ID/Locator Split Based heterogeneous network.

In accordance with an embodiment, a method for control node operation is provided. The method includes receiving an attach request, and attempting to authenticate/authorize the communications node. The attach request is a request from a communications node to attach to a heterogeneous network. The method also includes if the communications node authenticated/authorized successfully, causing an identification and a location to be assigned for the communications node, completing an attachment for the communications node, and transmitting information to the communications node. The identification and the location are separate values. The method further includes if the communications node did not authenticate/authorize successfully, sending an attach reject message to the communications node.

In accordance with another embodiment, a method for communications node operation is provided. The method includes transmitting an attach request, and receiving a response responsive to the attach request. The attach request includes a request to attach to a heterogeneous network. The method also includes if the response indicates that the attach request was accepted, completing an attachment to the heterogeneous network, and sending information over a communications link. The response includes an identification and a location for the communications node, and the identification and the location are separate values. The method further includes if the response indicates that the attach request was not accepted, transmitting a further attach request.

In accordance with another embodiment, a method for control node operation is provided. The method includes receiving a locator update request, and attempting to authenticate/authorize the communications node. The locator update request is a request from a communications node operating in a heterogeneous network. The method also includes if the communications node authenticated/authorized successfully, causing a binding to be computed for the communications node, updating the binding for the communication node, and completing a location update. The binding includes an identification and a location, and wherein the identification and the location are separate values. The method further includes if the communications node did not authenticate/authorize successfully, sending a locator update reject message to the communications node.

An advantage of an embodiment is that a network handshake with split ID and locator information is provided for a UE, which allows for the location of the UE to change while allowing an ID of the host session for the UE to remain constant.

A further advantage of an embodiment is that network attachment and location update with split ID and locator information resulting in improved network efficiency and allowing for routing optimization, as well as reduced network complexity are enabled. Furthermore, new features and services not possible without split ID and locator information are made possible.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a heterogeneous communications network with Third Generation Partnership Project (3GPP), WiMAX, 3GPP2, wireless LAN (WLAN), and so on, wireless access technologies. The invention may also be applied, however, to other wireless access technologies and wireless access technology combinations, such as, CDMA, CDMA2000, HRPD, DSL, cable, xPON, GSM, GPRS, EDGE, UMTS, HSPA, EV-DO, LTE, LTE-A, WiFi, IEEE 802.11, and so forth.

Figure 1A:
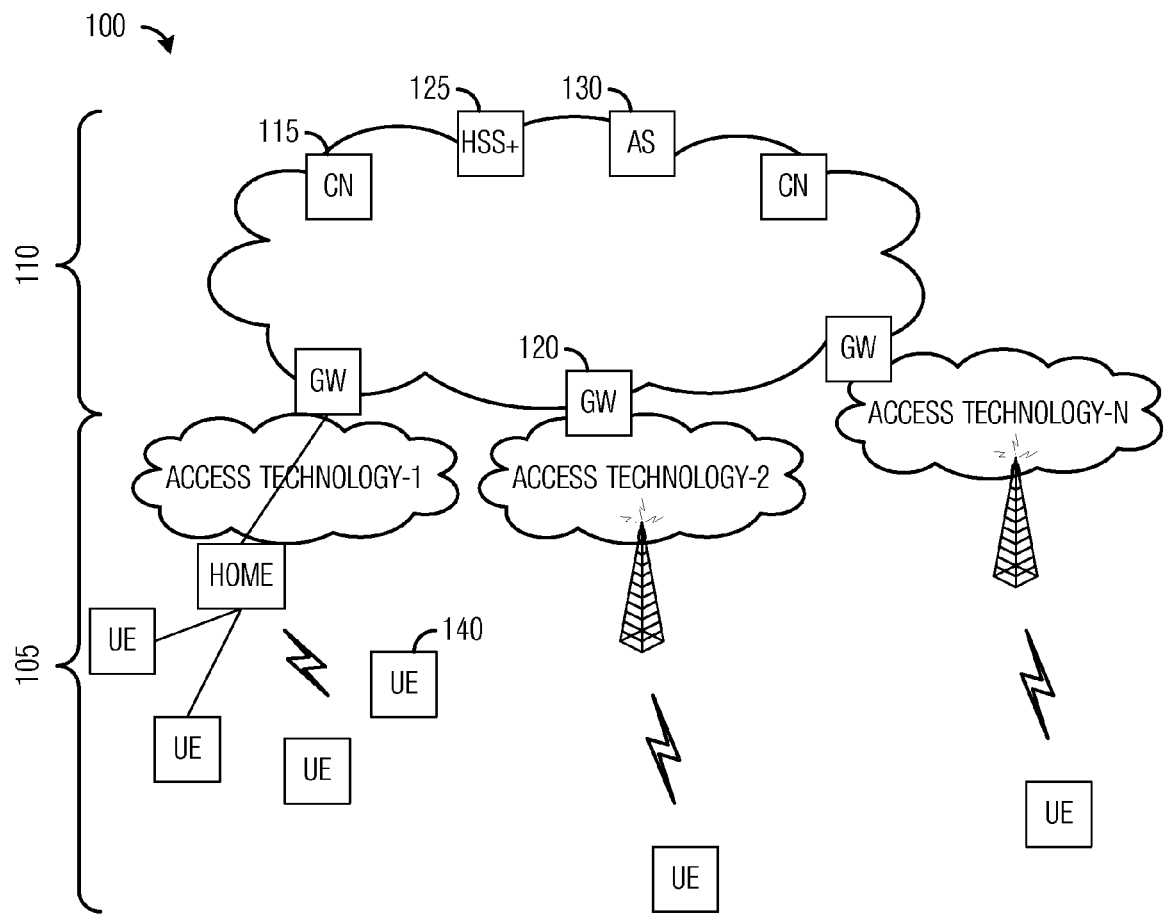
FIG. 1a is a diagram of a heterogeneous network.

FIG. 1a illustrates a heterogeneous network 100. Heterogeneous network 100 may have an ultra flat fixed-mobile converged broadband network architecture and may feature the ID-locator split. Heterogeneous network 100 includes two layers of networks: an access network 105 and a core or control network 110.

Access network 105 consists of any number of possible access technology based networks, ranging from fixed (DSL, Cable, WiFi, PON, etc.), mobile (GSM, CDMA, GPRS, EDGE, UMTS, HSPA/HSPA+, EV-DO, WiMAX, LTE, LTE+, etc.) and any other possible future new access technology based networks. Access network 105 also includes any type of access network environments, either home network, or enterprise network, or wide area network, or any possible types of future access network environments. Access network 105 permits user equipment (UE), such as UE 140, to connect to core network 110 and access information, execute applications, and so forth. UEs may also be commonly referred to as hosts, terminals, access terminals, mobile stations, subscribers, subscriber units, subscriber terminals, and so forth.

Core network 110 (also referred to as an ultra flat core network) is able to support aforementioned, any access technology based access networks, and network environments (also known as heterogeneous network environments). Key components in core network 110 are: Control Nodes (CN), such as CN 115, Gateways (GW), such as GW 120, Enhanced Home Subscriber databases and Servers (HSS+), such as HSS+ 125, and Application Servers (AS), such as AS 130.

In general, there may be several pieces of information associated with a single UE/device/host session, including a host session identity (host session ID), a UE identity (UE ID), a charging record, and a locator. The host session ID may be used to uniquely identify a UE/device/host session, while a charging record may be associated with a user subscription, which may use different UEs/devices/hosts and therefore may be common to several different UE ID. For example, a single user may be paying for several UEs under a single subscription. The locator may be associated with a single UE/device/host.

CNs, such as CN 115, are a generalized control node that supports ID-locator split, network policy, device/user/host attach, detach, locator update, security, mobility control/support, tracking a binding between a host session ID and a locator for a host session, and other signaling/control related functions. CNs may store the binding information of the host session ID and its locator (LOC), for example.

GWs, such as GW 120, are a generalized gateway function that supports ID-locator split, network policy enforcement, security, mobility support, border router, and other bearer and interworking related functions. The GW may assign a locator as well as generate a charging record for a host session.

HSS+, such as HSS+ 125, is an enhanced subscriber database to support ID-locator split in addition to its current HSS functions. HSS+ stores the binding information of the UE ID of a user/device/host and a CN locator serving the user/device/host, for example.

ASs, such as AS 130, also support ID-locator split in addition to the regular functions of the application server, such as hosting applications for execution on communications devices.

Figure 1B:
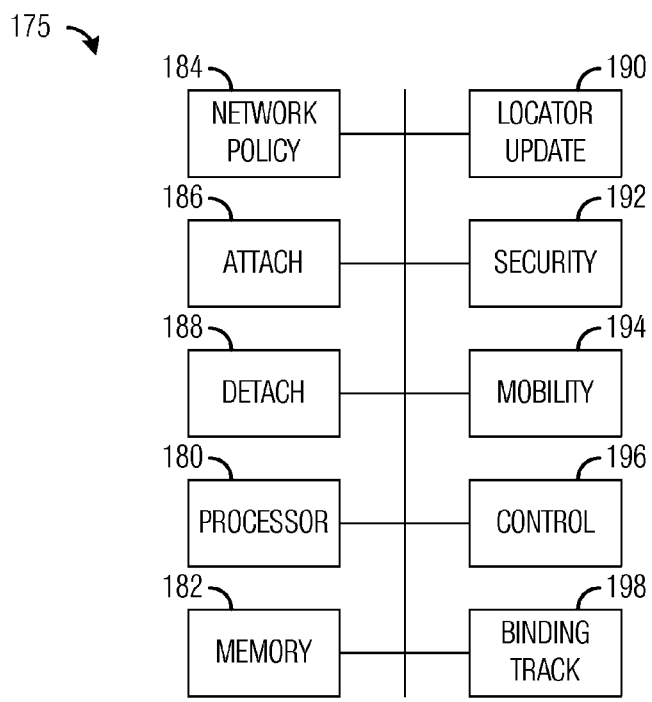
FIG. 1b is a diagram of a control node.

FIG. 1b illustrates a detailed view of a CN 175. As shown in FIG. 1b, CN 175 may be an implementation of a CN, such as CN 115 of heterogeneous network 100, and may have an ultra flat fixed-mobile converged broadband network architecture. CN 175 includes a processor 180 to perform operations and tasks as well as execute programs and procedures, and a memory 182 that may be used to store information, data, programs, procedures, and so forth. Memory 182 may store information such as binding information, such as host session ID and locator information for users/devices/hosts, for example.

CN 175 also includes a network policy unit 184 that may be used to implement network operation/communication policies, an attach unit 186 that may be used to perform operations to allow a user to attach to an access technology, and a detach unit 188 that may be used to perform operations to allow a user to detach from an access technology. Attach unit 186 and detach unit 188 may be used in conjunction to allow a user to detach from a first access technology while it attaches to a second access technology.

CN 175 further includes a locator update unit 190 that may be used to update locator information for a user as it moves about and attaches/detaches from various access technologies, a security unit 192 that may be used to implement security processes and procedures (to authenticate users, for example), and a mobility unit 194 that may be used to control the mobility of users based on the users service level, security level, and so forth, for example.

CN 175 may also include a control unit 196 that may be used to implement signaling and control related functions in general. CN 175 may also include a binding track unit 198 that may be used to maintain (i.e., keep track of a binding between a host session ID and a locator for a user. Although shown as separate units outside of processor 180, one or more of units 184 through 198 may be implemented in processor 180.

Figure 2:
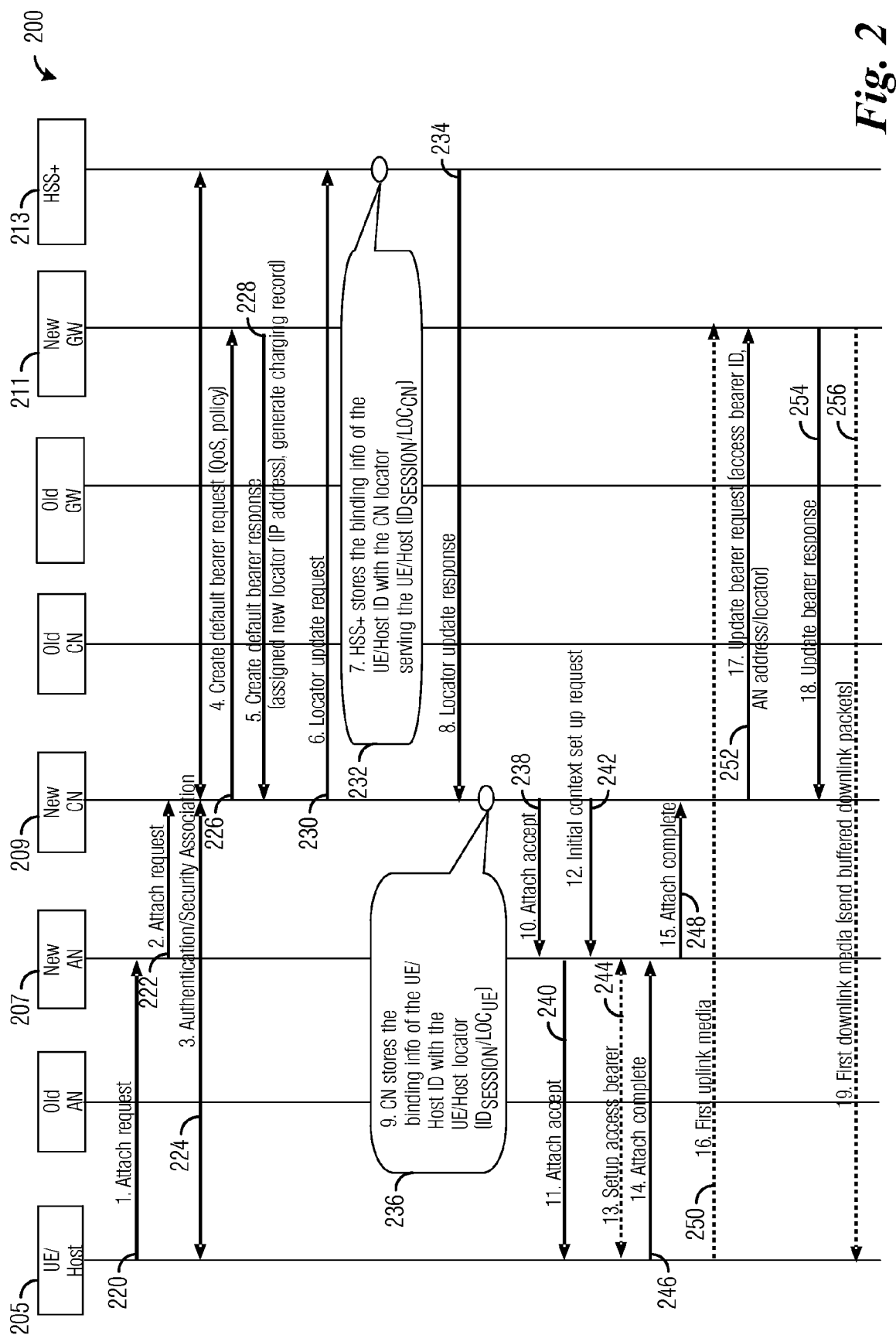
FIG. 2 is a diagram of a message exchange in an attach procedure.

FIG. 2 illustrates a message exchange 200 in an attach procedure. Message exchange 200 illustrates messages exchanged between devices and network components in a heterogeneous network, such as the ultra flat fixed-mobile converged broadband network shown in FIG. 1, as a UE/host 205 attaches to the heterogeneous network.

As UE/host 205 powers up, it is in need of network access to obtain a Locator (a control node). UE/host 205 may send an attach request message to a new AN 207 (Event #1 220). New AN 207 may pass the attach request message to a new CN 209 (Event #2 222). New CN 209 may initiate an authentication/authorization of UE/host 205 by exchanging messages between UE/host 205 and a HSS+ 213 (Event #3 224). Events #1-#3 may be considered to be the authentication/authorization of UE/host 205.

After successful authentication/authorization of UE/host 205, new CN 209 may send a create default bearer request to a new GW 211 (Event #4 226). The default bearer request may include Quality of Service (QoS) and policy specifications for UE/host 205. New GW 211 may send back a create default bearer response to new CN 209 (Event #5 228). The create default bearer response may include an assigned locator for UE/host 205 and a charging record for a user session. The assigned locator may be similar to an IP address in previous generation networks and the charging record may be used to charge UE/host 205 for services used.

When new CN 209 receives the create default bearer response from new GW 211, new CN 209 may send a locator update request to HSS+ 213 (Event #6 230). The locator update request may request that HSS+ 213 store binding information for UE/host 205. HSS+ 213 may store binding information for UE/host 205, including host session ID ($ID_{SESSION}$) with a new CN locator that serves UE/host 205 ($LOC_{CN}$) (Event #7 232). After successfully storing the binding information for UE/host 205, HSS+ 213 may send a locator update response to new CN 209 (Event #8 234) and new CN 209 stores the binding information of UE/host 205 ($ID_{UE}$) with the newly assigned locator of UE/host 205 ($LOC_{UE}$) (Event #9 236). Events #4-#9 may be considered to be the identification and locating of UE/host 205.

New CN 209 sends an attach accept message to new AN 207 (Event #10 238) and new AN 207 passes the attach accept message to UE/host 205 (Event #11 240). New CN 209 also sends an initial context set up request to new AN 207 (Event #12 242). The initial context set up request may be based on the QoS and policy agreed to or assigned earlier by a network policy server in new CN 209. An access bearer is set up between UE/host 205 and new AN 207 (Event #13 244). UE/host 205 sends an attach complete message to new AN 207 after the completion of the set up of the access bearer (Event #14 246) and new AN 207 sends an attach complete message to new CN 209 (Event #15 248). Events #10-#15 may be considered to be the completion of the attach procedure for UE/host 205.

With the completion of the attach procedure for UE/host 205 to the heterogeneous network, UE/host 205 may transmit an initial uplink media packet to new GW 211 (Event #16 250). In response to the transmission of the initial media packet, new CN 209 sends an update bearer request with access bearer ID and an AN address/locator to new GW 211 (Event #17 252). New GW 211 may respond with an update bearer response to new CN 209 (Event #18 254). New GW 211 may then send an initial downlink media packet to UE/host 205 (Event #19 256). Events #16-#19 may be considered to be the creation of links between UE/host 205 and new GW 211.

Figure 3:
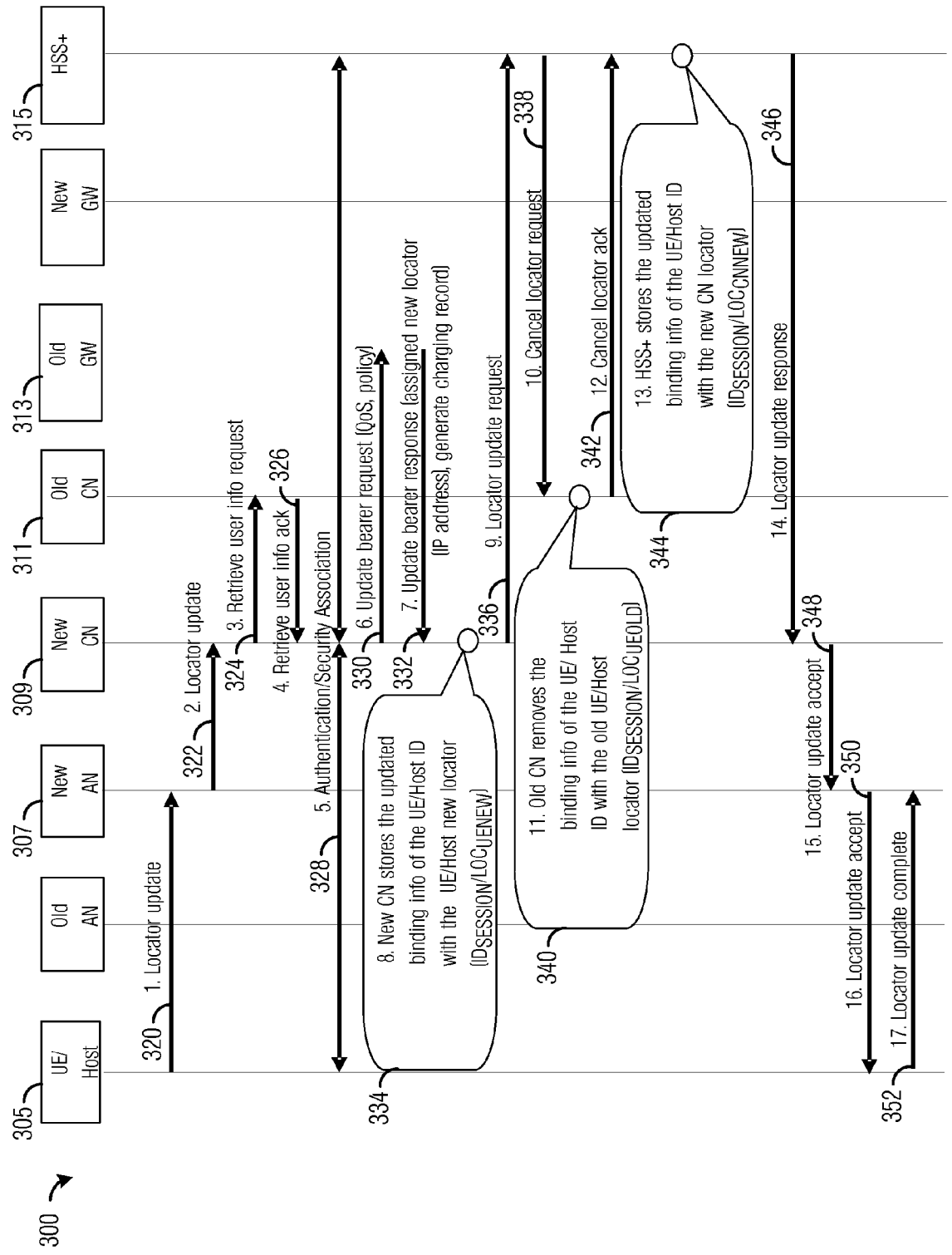
FIG. 3 is a diagram of a message exchange in a locator update procedure, wherein a UE/host updates its location without a gateway change.

FIG. 3 illustrates a message exchange 300 in a locator update procedure. Message exchange 300 illustrates messages exchanged between devices and network components in a heterogeneous network, such as the ultra flat fixed-mobile converged broadband network shown in FIG. 1, as a UE/host 305 updates its location without a GW change.

Message exchange 300 may begin with UE/host 305 sending a locator update message to new AN 307 (Event #1 320). UE/host 305 may send the locator update message as a result of its moving away from an old AN, for example. New AN 307 may pass the locator update message to new CN 309 (Event #2 322). New CN 309 may retrieve UE/host 305 information from old CN 311 by sending a retrieve user information request to old CN 311 (Event #3 324). Information that new CN 309 may retrieve from old CN 311 may include QoS, security associations, applications, and so forth. Old CN 311 may respond with a retrieve user information acknowledgement, which may contain the requested information (Event #4 326). New CN 309 may initiate an authentication/authorization of UE/host 305 by exchanging messages between UE/host 305 and HSS+ 315 (Event #5 328). Authentication/authorization of UE/host 305 may be optional depending on implementation of the heterogeneous network. Events #1-#5 may be considered to be the authentication/authorization of UE/host 305.

New CN 309 may decide that there is no GW change required even though UE/host 305 has changed CNs (from old CN 311 to new CN 309). However, since the AN has been changed, UE/host 305 needs to get a new locator from old GW 313. New CN 309 sends an update bearer request to old GW 313 (Event #6 330). The update bearer request may contain QoS and policy specifications for UE/host 305. Old GW 313 may send back an update bearer response to new CN 309 with newly assigned locator for UE/host 305 and a charging record for UE/host 305 (Event #7 332). The assigned locator may be similar to an IP address in previous generation networks and the charging record may be used to charge UE/host 305 for services used. New CN 309 may store the binding information for UE/host 305, including host session ID ($ID_{SESSION}$) with the newly assigned locator of UE/host 305 ($LOC_{UENEW}$) (Event #8 334). Events #6-#8 may be considered to be the obtaining of new binding information for UE/host 305.

If the heterogeneous network is designed so that UE/host 305 can keep the same locator previously assigned by old GW 313 with it as it switches to new CN 309 then there may be no new locator to be assigned. In such a situation there may be no newly assigned locator in Event #7 332 and in Event #8 334 new CN 309 may just store the binding information of UE/host 305 and an old locator of UE/host 305.

New CN 309 may then send a locator update request to HSS+ 315 (Event #9 336). The locator update request may result in HSS+ 315 storing the updated binding information of UE/host 305, including its ID and newly assigned locator. HSS+ 315 may send a cancel locator request to old CN 311 (Event #10 338). The cancel locator request may be sent by HSS+ 315 to old CN 311 to have old CN 311 remove binding information of UE/host 305, including its ID and the old locator of UE/host 305, which may be associated with old CN 311 and old AN of UE/host 305. Old CN 311 removes binding information (for example, ($ID_{UE}$/$LOC_{UEOLD}$)) of UE/host 305 (Event #11 340) and sends a cancel locator acknowledgement back to HSS+ 315 after removing the binding information of UE/host 305 (Event #12 342). HSS+ 315 may then store the updated binding information of UE/host 305 (Event #13 344). HSS+ 315 may store the host session ID ($ID_{SESSION}$) and a new CN locator of new CN 309 serving UE/host 305 ($LOC_{CNNEW}$). Events #9-#13 may be considered to be the updating of binding information for UE/host 305.

HSS+ 315 may also send a locator update response message to new CN 309 (Event #14 346). New CN 309 sends a locator update accept message to new AN 307 (Event #15 348), which may be passed onto UE/host 305 (Event #16 350). UE/host 305 sends a locator update complete message to new AN 307 to complete the locator update (Event #17 352). Events #14-#17 may be considered to be the completing the location update for UE/host 305.

Figure 4:
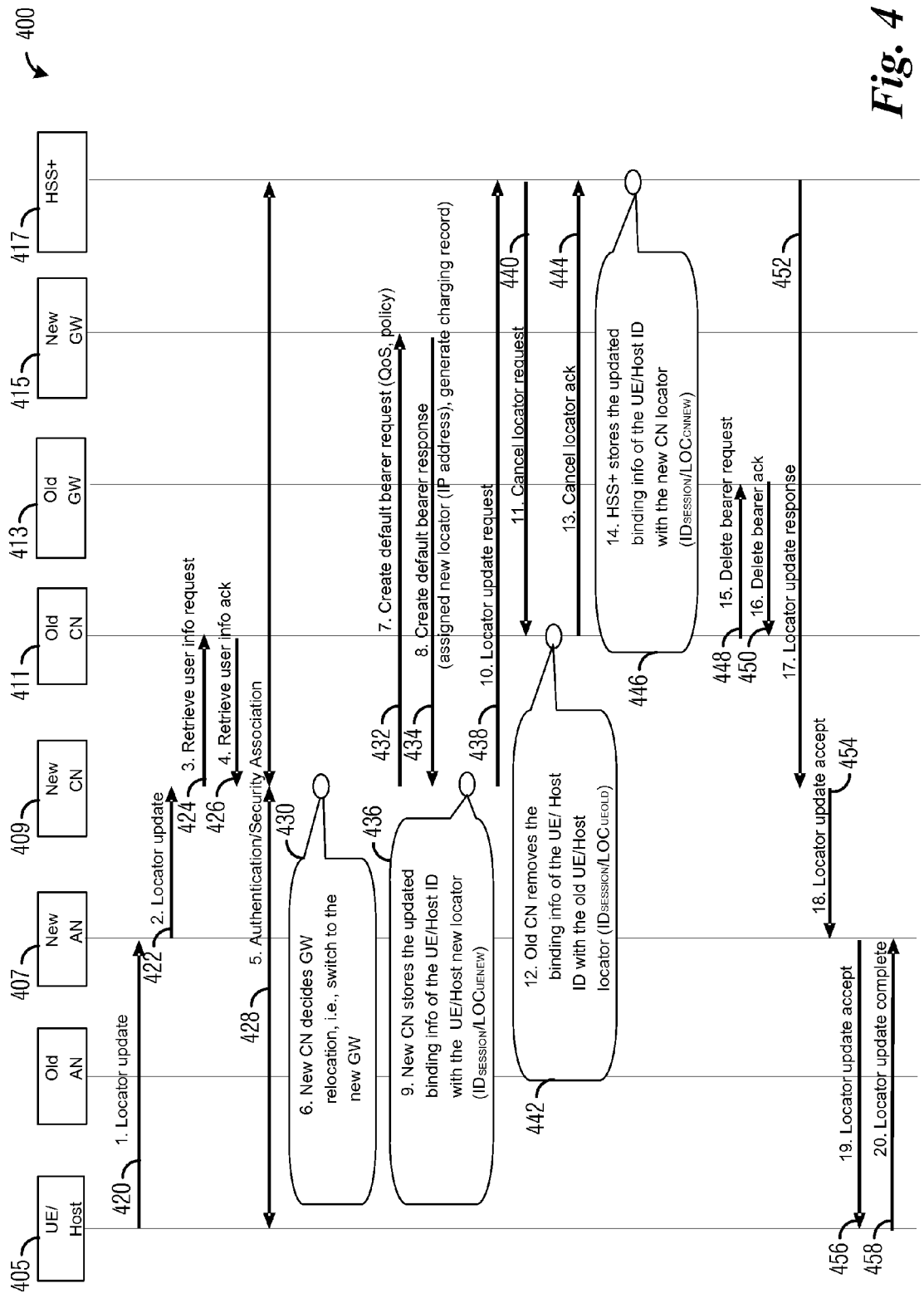
FIG. 4 is a diagram of a message exchange in a locator update procedure, wherein a UE/host updates its location with a gateway change.

FIG. 4 illustrates a message exchange 400 in a locator update procedure. Message exchange 400 illustrates messages exchanged between devices and network components in a heterogeneous network, such as the ultra flat fixed-mobile converged broadband network shown in FIG. 1, as a UE/host 405 updates its location with a GW change.

Message exchange 400 may begin with UE/host 405 sending a locator update message to new AN 407 (Event #1 420). UE/host 405 may send the locator update message as a result of its moving away from an old AN, for example. New AN 407 may pass the locator update message to new CN 409 (Event #2 422). New CN 409 may retrieve UE/host 405 information from old CN 411 by sending a retrieve user information request to old CN 411 (Event #3 424). Information that new CN 409 may retrieve from old CN 411 may include QoS, security associations, applications, and so forth. Old CN 411 may respond with a retrieve user information acknowledgement, which may contain the requested information (Event #4 426). New CN 409 may initiate an authentication/authorization of UE/host 405 by exchanging messages between UE/host 405 and HSS+ 417 (Event #5 428). Authentication/authorization of UE/host 405 may be optional depending on implementation of the heterogeneous network. Events #1-#5 may be considered to be the authentication/authorization of UE/host 405.

New CN 409 may decide that a GW change is required (from old GW 413 to new GW 415) (Event #6 430). New CN 409 may send a create default bearer request to new GW 415 (Event #7 432). The create default bearer request may include QoS and policy specifications for UE/host 405. New GW 415 may send back a create default bearer response to new CN 409 (Event #8 434). The create default bearer response may include a newly assigned locator for UE/host 405 and a charging record for UE/host 405. The assigned locator may be similar to an IP address in previous generation networks and the charging record may be used to charge UE/host 405 for services used. New CN 409 may then store binding information for UE/host 405 (Event #9 436). The binding information may include a host session ID for UE/host 405 ($ID_{SESSION}$) and the newly assigned locator ($LOC_{UENEW}$). Events #6-#9 may be considered to be the obtaining of new binding information for UE/host 405.

New CN 409 may then send a locator update request to HSS+ 417 (Event #10 438). The locator update request may result in HSS+ 417 storing the updated binding information of UE/host 405, including its ID and the new locator of new CN 409. HSS+ 417 may send a cancel locator request to old CN 411 (Event #11 440). The cancel locator request may be sent by HSS+ 417 to old CN 411 to have old CN 411 remove binding information of UE/host 405, including its ID and the old locator of UE/host 405, which may be associated with old CN 411 and old AN of UE/host 405. Old CN 411 removes binding information (for example, ($ID_{SESSION}/LOC_{UEOLD}$)) of UE/host 405 (Event #12 442) and sends a cancel locator acknowledgement back to HSS+ 417 after removing the binding information of UE/host 405 (Event #13 444). HSS+ 417 may then store the updated binding information of UE/host 405 (Event #14 446). HSS+ 417 may store the host session ID ($ID_{SESSION}$) and a new CN locator of new CN 409 serving UE/host 405 ($LOC_{CNNEW}$). Events #10-#14 may be considered to be the updating binding information for UE/host 405.

Old CN 411 may send a delete bearer request to old GW 413 (Event #15 448) and old GW 413 may send a delete bearer acknowledgement to old CN 411 after the old bearer has been released (Event #16 450). Events #15 and #16 may be considered to be deleting the old bearer.

HSS+ 417 may also send a locator update response message to new CN 409 (Event #17 452). New CN 409 sends a locator update accept message to new AN 407 (Event #18 454), which may be passed onto UE/host 405 (Event #19 456). UE/host 405 sends a locator update message to new AN 407 to complete the locator update (Event #20 458). Events #17-#20 may be considered to be the completing the location update for UE/host 405.

Figures 5A, 5B:
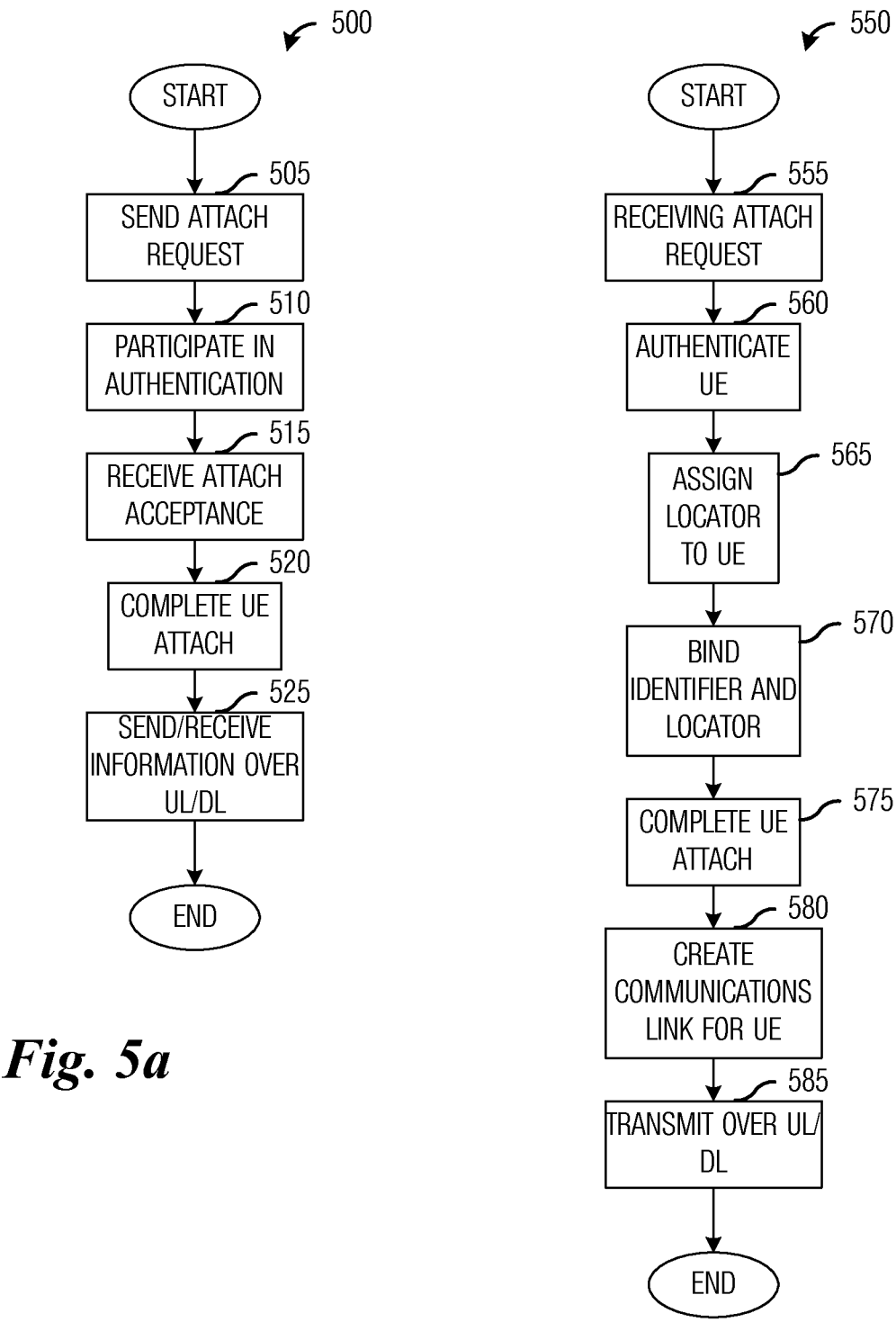
FIG. 5a is a flow diagram of UE operations in an attach procedure.
FIG. 5b is a flow diagram of CN operations in an attach procedure.

FIG. 5a illustrates a flow diagram of UE operations 500 in an attach procedure. UE operations 500 may be indicative of operations taking place in a UE, such as UE 205, as the UE participates in an attach procedure to attach to a heterogeneous network, such as the ultra flat fixed-mobile converged broadband network shown in FIG. 1. UE operations 500 occurs whenever the UE initially powers on in the heterogeneous network or after the UE returns to a coverage area of the heterogeneous network after having left the heterogeneous network for an extended period of time.

UE operations 500 may begin with the UE, as it powers up, needing network access to obtain a locator (a control node (CN)). The UE may send an attach request message to an AN (block 505). The AN may, in turn, pass the request message to a CN. The CN may initiate an authentication/authorization of the UE by exchanging messages with the UE and a HSS+ (block 510).

If the UE authenticates and is authorized service in the heterogeneous network, then the attach request from the UE may be accepted. The UE may receive an attach acceptance message from the AN (block 515). The attach acceptance message may provide to the UE its identification (e.g., a host session ID) and location (e.g., a locator) information. The UE may then participate in a completion of the attach procedure (block 520). The completion of the attach procedure may involve the setting up of an access bearer between the UE and the AN. With the completion of the attach procedure, the UE may send information over a UL and/or receive information over a DL (block 525). UE operations 500 may then terminate.

If the attach request from the UE was not accepted, through an authentication/authorization failure, an error in transmission, or so forth, the UE may reattempt the attach request at a later time by retransmitting the attach request. The UE may wait a specified amount of time prior to retransmitting the attach request or the UE may generate a randomly generated wait time and allow the generated amount of time to elapse prior to retransmitting the attach request.

FIG. 5b illustrates a flow diagram of CN operations 550 in an attach procedure. CN operations 550 may be indicative of operations taking place in a CN, such as CN 209, as a UE, such as UE 205, initiates an attach procedure to attach to a heterogeneous network, such as the ultra flat fixed-mobile converged broadband network shown in FIG. 1. CN operations 550 occurs whenever the CN receives an attach request message from the UE.

CN operations 550 may begin with the CN receiving an attach request message from an AN, which received the attach request message from the UE (block 555). After receiving the attach request message, the CN may need to authenticate/authorize the UE to ensure that UE is authentic and is authorized to access the heterogeneous network. The CN may exchange messages with the UE and a HSS+ to authenticate/authorize the UE (block 560).

The CN may then cause the assignment of a charging record and a locator (block 565) for the UE. The CN may accomplish the binding of the identifier and the locator for the UE by transmitting a locator update request to the HSS+ (block 570). A GW may assign a locator and generate a charging record for the UE as part of binding information that is created for the UE. The CN may then complete the attach procedure by transmitting an attach acceptance message to the UE and sending an initial context set up request to the AN (block 575). The initial context set up request may initiate the establishment of an access bearer between the UE and the AN. The CN may then transmit information to the UE or receive information from the UE (block 585) and CN operations 550 may then terminate.

If the attach request was not accepted, for example, because the UE was not authorized and/or authenticated, then the CN may transmit an attach reject message to the UE to inform the UE that its attach request was rejected.

Figure 6A:
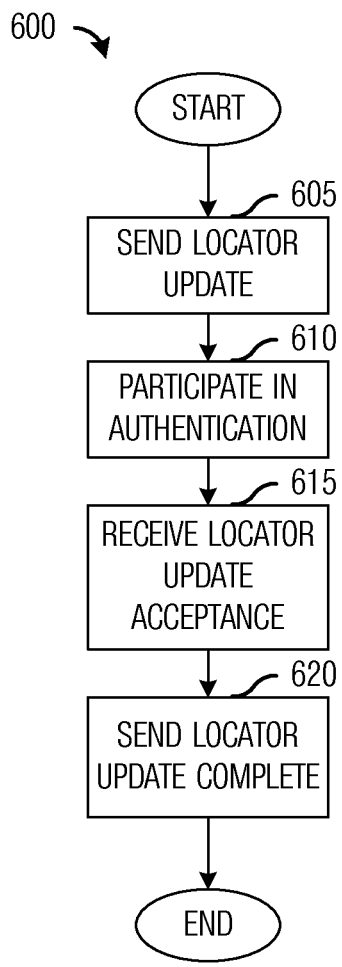
FIG. 6a is a flow diagram of UE operations in a locator update procedure.

FIG. 6a illustrates a flow diagram of UE operations 600 in a locator update procedure. UE operations 600 may be indicative of operations taking place in a UE, such as UE 205, as the UE participates in locator update procedure in a heterogeneous network, such as the ultra flat fixed-mobile converged broadband network shown in FIG. 1. UE operations 600 occurs whenever the UE moves away from a coverage area of an old AN and into a coverage area of a new AN.

UE operations 600 may begin with the UE sending a locator update message to a new AN (block 605). The UE may send the locator update message to the new AN as a result of it moving away from a coverage area of an old AN and into a coverage area of the new AN, for example. The new AN may pass the locator update message to a new CN, which may authenticate/authorize the UE by exchanging messages with the UE, an old CN, a HSS+, and the new CN (block 610). For example, the new CN may retrieve UE information from the old CN. UE information may include QoS restrictions, security associations, applications, and so forth. Additionally, the new CN may authenticate and authorize the UE with the HSS+.

The locator update may occur with or without a GW change. If the mobility of the UE results in a locator update without a GW change, only changes in an existing access bearer may be needed to comply with changes in QoS, policy, and so forth. However, if a locator update with a GW change is required, then a new access bearer may need to be established with a new GW and an existing access bearer with an old GW may need to be deleted.

If the UE is authorized and authenticated, the UE may then receive a locator update acceptance (block 615). The locator update acceptance may include new binding information for the UE, which may include a new CN locator. The UE may send a locator update complete message to the new AN to complete the locator update (block 620) and UE operations 600 may then terminate.

If the locator update request from the UE was not accepted, through an authentication/authorization failure, an error in transmission, or so forth, the UE may reattempt the locator update request at a later time by retransmitting the locator update request. The UE may wait a specified amount of time prior to retransmitting the locator update request or the UE may generate a randomly generated wait time and allow the generated amount of time to elapse prior to retransmitting the locator update request.

Figure 6B:
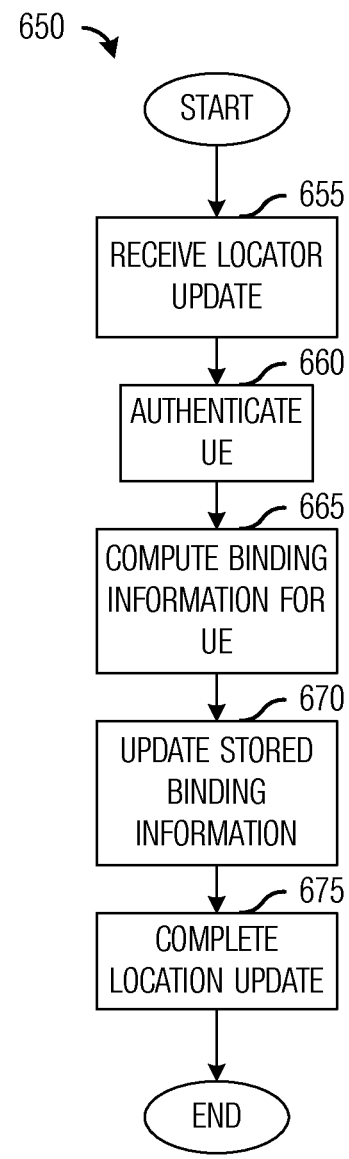
FIG. 6b is a flow diagram of CN operations in a locator update procedure.

FIG. 6b illustrates a flow diagram of CN operations 650 in a locator update procedure. CN operations 650 may be indicative of operations taking place in a CN, such as CN 209, as a UE, such as UE 205, moves away from a coverage area of an old AN and to a coverage area of a new AN in a heterogeneous network, such as the ultra flat fixed-mobile converged broadband network shown in FIG. 1. CN operations 650 occurs whenever the CN receives a locator update request message from the UE.

CN operations 650 may begin with a new CN receiving a locator update message from the UE, where the locator update message may be forwarded to the new CN from a new AN (block 655). The new CN may proceed to authenticate/authorize the UE (block 660). Authenticating/authorizing the UE may include retrieving UE information from an old CN of the UE and exchanging messages with the UE, the old CN, and a HSS+ to authenticate/authorize the UE, for example.

The new CN may then cause a computing of new binding information for the UE (block 665). If the mobility of the UE has not resulted in a locator update that requires a GW change, the new CN may cause the computing of new binding information for the UE by requesting that an existing access bearer for the UE be updated based on any new QoS restrictions, policy changes, and so forth. However, if the mobility of the UE has resulted in a locator update that requires a GW change, then the new CN may cause the computing of new binding information for the UE by creating a new access bearer for the UE with a new GW and deleting an existing access bearer at an old GW.

The updated access bearer or the newly created access bearer may have a new binding, which may be updated at the HSS+ (block 670). The new binding may include a locator, which may be provided to the UE as the new CN completes the location update (block 675) and CN operations 650 may then terminate.

If the locator update request was not accepted, for example, because the UE was not authorized and/or authenticated, then the CN may transmit locator update reject message to the UE to inform the UE that its locator update request was rejected.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a control node, the method comprising:
   receiving a locator update request indicating that a user equipment (UE) has migrated from a previous access node (AN) to a new AN;
   retrieving a user information indicating that the UE was assigned a locator identifier (ID) upon attachment to the previous AN, and further indicating that a UE has been assigned an original host session identifier (ID) that uniquely identifies a communications session of the UE;
   sending a request message to a gateway; and
   receiving a response message from the gateway indicating that the UE has been assigned a new locator ID without being assigned a new host session ID such that the original host session ID remains assigned to the UE.

2. The method of claim 1 further comprising:
   storing a binding information that associates the new locator ID with the original host session ID.

3. The method of claim 1, wherein the original host session ID is uniquely assigned to the UE such that the original host session ID is not assigned to any other UEs.

4. The method of claim 1, wherein the original host session ID remains constant during migration of the UE from the previous AN to the new AN.

5. The method of claim 1, wherein retrieving the user information comprises retrieving an old binding from an old control node, the old control node serving the UE when the UE was attached to the previous AN.

6. A control node comprising:
   a processor; and
   a non-transitory computer readable storage medium storing programming for execution by the processor, the programming including instructions to:
      receive a locator update request indicating that a user equipment (UE) has migrated from a previous access node (AN) to a new AN;
      retrieve a user information indicating that the UE was assigned an original locator identifier (ID) upon attachment to the previous AN, and further indicating that a UE has been assigned an original host session identifier (ID);
      send a request message to a gateway; and
      receive a response message from the gateway indicating that the UE has been assigned a new locator ID without being assigned a new host session ID such that the original host session ID remains assigned to the UE.

7. The control node of claim 6, wherein the programming further includes instructions to:
   store a binding information that associates the new locator ID with the original host session ID.

8. The control node of claim 6, wherein the original host session ID uniquely identifies a communications session of the UE.

9. The control node of claim 6, wherein the original host session ID remains constant during migration of the UE from the previous AN to the new AN, and wherein the original locator ID comprises a different value than the new locator ID.

10. The control node of claim 6, wherein the request message is an update bearer request message, and wherein the gateway serves both the previous AN and the new AN.

11. The control node of claim 6, wherein the request message is a create default bearer request message, and wherein the gateway serves the new AN, but not the previous AN.

12. A control node comprising: a processor, and a non-transitory computer readable storage medium storing programming for execution by the processor, the programming including instructions to: receive an attach request message requesting attachment of a user equipment (UE) to a new access node (AN), wherein the UE is associated with an original locator identifier (ID) and an original host session identifier (ID) prior to completion of the requested attachment, send a bearer request message to a gateway, receive a bearer response message from the gateway indicating assignment of a new locator ID to the UE for use after completion of the requested attachment, and complete the requested attachment of the UE, wherein the original host session ID remains assigned to the UE after the requested attachment is complete.

13. The control node of claim 12, wherein the instructions to complete the requested attachment include instructions to store a binding information that associates the new locator ID with the original host session ID.

14. The control node of claim 12, wherein the instructions to complete the requested attachment include instructions to:
   send a locator update request to a Home Subscriber database and Server (HSS) comprising the new locator ID, wherein receiving the locator update request causes the HSS to update an original binding information associating the original host session ID with the original locator ID to an updated binding information associating the original host session ID with the new locator ID.

15. The control node of claim 12, wherein the programming further includes instructions to:
   set up a context for the UE; and
   set up an access bearer for the UE.

16. The control node of claim 12, wherein the instructions to complete the requested attachment include instructions to facilitate the establishment of communications links for the UE.

17. The control node of claim 16, wherein the instructions to establish communications links include instructions to:
   update a bearer for the UE in response to detecting a first uplink media packet transmitted by the UE; and
   transmit a first downlink media packet to the UE after receiving a response from an updating of information related to the UE.

18. A gateway in a heterogeneous network, the gateway comprising:
   a processor; and
   a non-transitory computer readable storage medium storing programming for execution by the processor, the programming including instructions to:
      receive a bearer request message indicating that a user equipment (UE) attached a previous Access Node (AN) in the heterogeneous network is requesting attachment to a new AN in the heterogeneous network, wherein an original host session identifier (ID) is associated with an original locater ID prior to completion of the requested attachment; and
      assign a new locator identifier (ID) to the UE for use after completion of the requested attachment, wherein the original host session ID remains assigned to the UE after completion of the requested attachment.

19. The gateway of claim 18, wherein the programming further comprises instructions to:
   send a bearer response message comprising the new locator ID to a control node, wherein receiving the bearer response causes the control node to save a binding information that associates the new locator ID with the original host session ID.

20. The gateway of claim 18, wherein the original host session ID uniquely identifies a communications session of the UE, and wherein the original host session ID comprises a different value than the new locator ID.

21. The gateway of claim 18, wherein the request message is an update bearer request message, and wherein the gateway serves both the previous AN and the new AN.

22. The gateway of claim 18, wherein the request message is a create default bearer request message, and wherein the gateway serves the new AN, but not the previous AN.

* * * * *